United States Patent
Kasahara et al.

(10) Patent No.: US 6,756,336 B2
(45) Date of Patent: Jun. 29, 2004

(54) CATALYST FOR PURIFYING EXHAUST GASES

(75) Inventors: Koichi Kasahara, Ogasa-gun (JP);
Yasunori Sato, Ogasa-gun (JP);
Kenichi Taki, Ogasa-gun (JP)

(73) Assignee: Cataler Corporation, Ogasa-gun (JP)

( * ) Notice: Subject to any disclaimer, the term of this patent is extended or adjusted under 35 U.S.C. 154(b) by 100 days.

(21) Appl. No.: 10/060,163

(22) Filed: Feb. 1, 2002

(65) Prior Publication Data

US 2003/0148875 A1 Aug. 7, 2003

(51) Int. Cl.$^7$ .................................. B01J 29/06
(52) U.S. Cl. ........................ 502/65; 502/64; 502/66; 502/74; 502/73
(58) Field of Search ............. 502/64, 65, 66, 502/74, 73

(56) References Cited

U.S. PATENT DOCUMENTS

| | | | |
|---|---|---|---|
| 5,057,483 A | * 10/1991 | Wan | 502/304 |
| 5,837,642 A | * 11/1998 | Tanaka et al. | 502/304 |
| 6,047,544 A | * 4/2000 | Yamamoto et al. | 60/285 |
| 6,261,989 B1 | * 7/2001 | Tanaka et al. | 502/217 |
| 6,413,898 B1 | * 7/2002 | Faber et al. | 502/64 |
| 2003/0108465 A1 | * 6/2003 | Voss et al. | 423/213.2 |
| 2003/0153453 A1 | * 8/2003 | Kasahara et al. | 502/64 |

FOREIGN PATENT DOCUMENTS

| | | |
|---|---|---|
| EP | 0 582 971 A1 | 2/1994 |
| EP | 0 918 145 A2 | 5/1999 |
| JP | A 6-142519 | 5/1994 |
| JP | 07144119 | 6/1995 |
| JP | A 7-213910 | 8/1995 |
| JP | A 11-104462 | 4/1999 |
| JP | A 11-210451 | 8/1999 |
| JP | A 11-221466 | 8/1999 |
| JP | A 11-253758 | 9/1999 |
| JP | 11324662 | 11/1999 |

\* cited by examiner

*Primary Examiner*—Kiley Stoner
*Assistant Examiner*—Christina Ildebrando
(74) *Attorney, Agent, or Firm*—Oliff & Berridge, PLC

(57) ABSTRACT

A catalyst for purifying exhaust gases exhibits not only effective purifying characteristics even in a low temperature range such as immediately after an engine starts but also high exhaust gas purifying ability. In the catalyst for purifying exhaust gases of a first aspect of the invention, HC adsorbed at low temperature are released at high temperature and the released HC are purified by a catalyst metal. This catalyst for purifying exhaust gases has an excellent advantage in purifying HC at low temperature as well as excellent exhaust gas purifying ability.

11 Claims, No Drawings

CATALYST FOR PURIFYING EXHAUST GASES

BACKGROUND OF THE INVENTION

1. Field of the Invention

The present invention relates to a catalyst for purifying exhaust gases.

2. Description of the Related Art

Exhaust gases from automotive engines and other internal combustion engines contain harmful components such as hydrocarbons (HC), carbon monoxide (CO) and nitrogen oxides ($NO_x$). It exhaust gases containing these harmful components are emitted into the air without any treatment, pollution and environmental degradation will occur. Therefore, exhaust gases containing these harmful components are emitted into the air after purified by such a purifying apparatus as a catalyst for purifying exhaust gases.

The catalyst for purifying exhaust gases converts $NO_x$, HC and CO contained in exhaust gases into innocuous nitrogen, carbon dioxide or water by catalyst metal.

It is known that HC conversion is strongly influenced by temperature and generally carried out at not less than 300° C. When catalyst temperature is low, catalytic activity of catalyst metal is too low to convert HC in exhaust gases. The catalyst for purifying exhaust gases is heated by exhaust gases. This fact indicates that the catalyst soon after an engine starts has a low temperature. Besides, exhaust gases immediately after an engine starts contain a large amount of HC and the ratio of HC in the emission is large.

Accordingly, it is a critical problem to suppress HC emission from a catalyst when the catalyst has a low temperature.

This catalyst for purifying exhaust gases which suppresses HC emission can be produced, for example, by forming a catalyst carrier layer composed of alumina, etc. on the surface of a catalyst support and forming a HC conversion part for converting HC and a $NO_x$ conversion part for converting $NO_x$ and CO separately on the catalyst carrier layer. In this catalyst, there are two kinds of separation of the HC conversion part and the $NO_x$ conversion part: separation in an axial direction of the catalyst support and separation in a thickness direction of the catalyst carrier.

Examples of this catalyst are disclosed in Japanese Unexamined Patent Publication Nos.H11-253758, H11-104462, H7-213910, H6-142519, H11-210451, and H11-221466.

Japanese Unexamined Patent Publication No.H6-142519 discloses a hydrocarbon adsorptive catalyst which is provided with a first layer of ZSM-5 zeolite ion-exchanged with at least one metal of Cu and Pd, which are effective for hydrocarbon adsorption, on a monolithic carrier, a second layer of a powder based on activated ceria and/or alumina containing at least one metal of Pt and Pd as a catalytic component on the first layer, and a third layer containing Rh as a catalytic component on the second layer.

Japanese Unexamined Patent Publication No.H7-213910 discloses an exhaust gas purifying catalyst comprising an adsorbing catalyst formed of a catalyst carrier and a zeolite layer coated thereon, wherein a catalyst layer composed of a powder based on activated ceria and/or alumina containing at least one element of Pt, Pd and Rh as a catalytic component is provided on the zeolite layer.

Japanese Unexamined Patent Publication No.H11-104462 discloses a catalyst-adsorber for purifying exhaust gases, which is prepared by covering and loading an adsorbing layer composed of an adsorbent with hydrocarbon adsorbability on a monolithic carrier and covering and loading a catalyst layer composed of a catalyst material with purifying ability for harmful components in exhaust gases on the adsorbing layer, the catalyst layer having a thickness of 10 to 120 μm.

Japanese unexamined Patent Publication No.H11-210451 discloses an exhaust gas purifying catalyst device formed by providing, in exhaust passages, a HC-adsorbing catalyst comprising a double-layered part constituted by a HC-adsorbent lower layer and a three-way catalyst upper layer, and a single-layered part constituted by a three-way catalyst layer alone and positioned on the downstream side of the exhaust emission flow.

Japanese Unexamined Patent Publication No.H11-221466 discloses a catalyst for purifying exhaust gases, wherein a catalyst containing zeolite is arranged in a front stage part to an exhaust gas flow, and a catalyst consisting of three catalyst layers is arranged in a rear stage part to the exhaust gas flow. Of the three catalyst layers, the first catalyst layer contains at least one component of platinum (Pt), palladium (Pd) and rhodium (Rh) and at least one component of alkali metals, alkaline earth metals, and rare earth elements, the second catalyst layer contains alumina and/or silica, and the third catalyst layer contains zeolite including a copper component and a cobalt component, and the first, second and third catalyst layers are overlaid in turn.

Japanese Unexamined Patent Publication No.H11-253758 discloses a catalyst for purifying exhaust gases comprising: a first catalytic layer containing one or more components of a platinum component, a palladium component and a rhodium component and one or more kinds of components of alkali metals, alkaline earth metals and rare earth elements; a second catalytic layer containing β-zeolite, formed on the first catalytic layer; and a third catalytic layer which is composed mainly of zeolite containing a copper component and/or a cobalt component and formed on the second catalytic layer. In this case, the second catalytic layer structurally contains silica ($SiO_2$).

Moreover, as evidenced by severer automotive emission limits, there is a demand for an improvement in HC purifying ability and exhaust gas purifying ability of a catalyst for purifying exhaust gases.

SUMMARY OF THE INVENTION

The present invention has been conceived in view of the aforementioned actual circumstances. It is an object of the present invention to provide a catalyst for purifying exhaust gases which exhibits effective purifying characteristics even in a low-temperature range such as immediately after an engine start, and high exhaust gas purifying ability.

The present inventors have studied on the structure of the catalyst for purifying exhaust gases in order to attain the above objects, and found that the above objects can be attained by loading catalyst metal additionally on a front stage part and/or a rear stage part of a catalyst metal-contained carrier layer to the exhaust gas flow.

A catalyst for purifying exhaust gases according to a first aspect of the present invention characteristically comprises: a catalyst support having tubular passages through which exhaust gases flow in an axial direction; a coating layer formed on a surface of the catalyst support and composed of zeolite, refractory inorganic oxide, and a first catalyst metal loaded on a surface of the refractory inorganic oxide; and a second catalyst metal loaded on a front stage part of the coating layer, which is an upstream end of the exhaust gas flow, and/or a rear stage part of the coating layer, which is a downstream end of the exhaust gas flow.

The catalyst for purifying exhaust gases according to this aspect of the present invention is excellent in HC purifying ability, since the second catalyst metal is loaded on the front stage part and/or the rear stage part.

Moreover, the present inventors have studied about HC conversion and exhaust gas purification of a catalyst for purifying exhaust gases and found that the above objects can be attained by employing β-zeolite, which has a high HC-adsorbing ability, and a Ce—Zr—Y composite oxide, which has a high oxygen storage ability, for a catalyst for purifying exhaust gases.

A catalyst for purifying exhaust gases according to a second aspect of the present invention characteristically comprises a heat-resistant catalyst support, and a catalytic coating layer composed of β-zeolite, a Ce—Zr—Y composite oxide, refractory inorganic oxide and a catalyst metal and formed on a surface of the catalyst support.

The catalyst for purifying exhaust gases according to this aspect of the present invention is excellent in HC purifying ability, since β-zeolite adsorbs HC from low temperature to high temperature. Besides, the catalyst for purifying exhaust gases attains high oxygen storage ability and excellent exhaust gas purifying ability since the catalyst for purifying exhaust gases includes a composite oxide.

DETAILED DESCRIPTION OF THE INVENTION (The First Aspect of the Invention)

The catalyst for purifying exhaust gases according to the first aspect of the present invention comprises a catalyst support, a coating layer, and a second catalyst metal.

The catalyst support is a member having tubular passages through which exhaust gases pass in an axial direction. Since the catalyst support has a structure having tubular passages through which exhaust gases pass, the catalyst can have larger contact area with exhaust gases. As the contact area with exhaust gases is larger, catalyst metal of the catalyst and exhaust gases to be purified are brought in more contact and the exhaust gas purifying ability of the catalyst is improved. This type of catalyst employs, for example, a monolithic honeycomb catalyst support. The catalyst support can be formed of a conventional material such as cordierite and other heat-resistant ceramics and stainless steel and other heat-resistant metals.

The coating layer is formed on a surface of the catalyst support and composed of zeolite, refractory inorganic oxide, and a first catalyst metal loaded on a surface of the refractory inorganic oxide. Since the coating layer contains the first catalyst metal, the coating layer can purify exhaust gases.

Zeolite adsorbs HC at low temperature and releases the adsorbed HC at high temperature. The HC adsorbed by zeolite at low temperature and released from the zeolite at high temperature are contacted with a first or a second catalyst metal and purified. This zeolite is not particularly limited, as long as it can adsorb and release HC. Examples of the zeolite include ZSM-5, USY, β-zeolite, silicalite and metallosilicate. It is more preferable to employ β-zeolite, which has an excellent HC-adsorbing characteristics.

The zeolite content of the coating layer is preferably 20 to 80 wt % based on the entire coating layer. That is to say, when the coating layer contains 20 to 80 wt % of zeolite, HC contained in exhaust gases are sufficiently purified. If the zeolite content is less than 20 wt %, because of the small zeolite amount, the amount of HC adsorbed is decreased and the HC-purifying ability of the catalyst deteriorates. On the other hand, the zeolite content of more than 80 wt % has an adverse affect on catalytic activity and decreases the purifying ability of the catalyst. It is to be noted that the coating layer is composed of zeolite, refractory inorganic oxide and a first catalyst metal, and does not include a second catalyst metal.

The refractory inorganic oxide forms a catalyst carrier for a first catalyst metal. The refractory inorganic oxide is preferably alumina. Owing to high heat resistance and high chemical stability at high temperature, alumina does not react with the first catalyst metal or exhaust gases. This alumina is more preferably activated alumina (τ-alumina).

The first catalyst metal is loaded on the refractory inorganic oxide. Because the first catalyst metal is loaded not on zeolite but on the refractory inorganic oxide, the first catalyst metal can exhibit its catalytic ability effectively. If the first catalyst metal is loaded on zeolite, HC adsorbed by zeolite make the first catalyst metal suffer from HC poisoning and the catalytic ability of the first catalyst metal deteriorates.

The first catalyst metal preferably comprises at least one element selected from a group consisting of Pt, Pd and Rh. Since the first catalyst metal comprises at least one element selected from a group consisting of Pt, Pd and Rh, the first catalyst metal can purify HC, CO and $NO_x$.

The first catalyst metal content of the coating layer is preferably 1 to 10 wt % based on the entire coating layer. That is to say, when the coating layer contains 1 to 10 wt % of the first catalyst metal, exhaust gases can be sufficiently purified. If the first catalyst metal content is less than 1 wt %, the amount of the first catalyst metal is small and purification of exhaust gases is insufficient. On the other hand, with the first catalyst metal content of more than 10 wt %, an improvement in exhaust gas purifying effect is small with respect to an increase in the amount of the catalyst metal loaded. The first catalyst metal content is more preferably 3 to 8 wt %. The coating layer is composed of zeolite, refractory inorganic oxide and the first catalyst metal and does not include the second catalyst metal.

The second catalyst metal is loaded on the front stage part of the coating layer, which is an upstream end of the exhaust gas flow, and/or a rear stage part of the coating layer, which is a downstream end of the exhaust gas flow. Since the second catalyst metal is loaded on the coating layer, the catalyst attains improved HC-purifying ability.

specifically speaking, in the catalyst of the present invention HC contained in exhaust gases at low temperature are adsorbed by zeolite of the coating layer. When the second catalyst metal is loaded on the front stage part, the second catalyst metal speedily rises to catalytic activity temperature and purifies the HC adsorbed by zeolite. On the other hand, when the second catalyst metal is loaded on the rear stage part, the second catalyst metal purifies the HC released from zeolite at a high efficiency. A catalyst having the second catalyst metal both on the front stage part and the rear stage part exhibits both the effects.

The second catalyst metal serves to purify exhaust gases. This second catalyst metal preferably comprises at least one element selected from a group consisting of Pt, Pd and Rh. Since Pt, Pd and Rh exhibit three-way catalytic activity, the second catalyst metal constituted by the at least one element selected from a group consisting of Pt, Pd and Rh can purify HC, CO and $NO_x$.

The first catalyst metal and the second catalyst metal can be either the same catalyst metal or different catalyst metals.

The second catalyst metal content is preferably 1 to 7 wt % based on the entire catalyst for purifying exhaust gases. If the second catalyst metal content is less than 1 wt %, the amount of the second catalyst metal loaded is small and the effect of purifying HC is decreased. On the other hand, if the second catalyst metal content is more than 7 wt %, an improvement in the exhaust gas purification effect is small with respect to an increase in the amount of the second catalyst metal loaded.

It is preferable that the axial length of the front stage part and the rear stage part are respectively one-third to one-tenth of that of the catalyst for purifying exhaust gases. If it is shorter than one-tenth of the axial length of the catalyst, the volume of each stage part used for purification is smaller and the effect of the second catalyst metal loaded cannot be exhibited. On the other hand, if it is longer than one-third of the axial length of the catalyst, the density of the second catalyst metal loaded is smaller and the purification effect cannot be sufficiently obtained.

The coating layer preferably comprises a HC-adsorbing layer composed of zeolite and formed on a surface of the catalyst support, and a catalyst-contained layer composed of refractory inorganic oxide and a first catalyst metal and formed on the HC-adsorbing layer.

Since the coating layer has a layered structure of the HC-adsorbing layer and the catalyst-contained layer, the catalyst for purifying exhaust gases attains improved purifying ability. That is to say, since the catalyst-contained layer is formed on the surface of the HC-adsorbing layer, when HC adsorbed by the HC-adsorbing layer are released from the HC-adsorbing layer, all of the HC are brought in contact with the catalyst-contained layer. At this time, the HC released from the HC-adsorbing layer are purified not only by the second catalyst metal but also by the first catalyst metal contained in the catalyst-contained layer.

The coating layer may include an additive contained in a catalyst carrier layer of a conventional catalyst for purifying exhaust gases. Examples of the additive include BaO and cerium oxide. The amount of the additive can be the same as those of the conventional catalyst for purifying exhaust gases.

The catalyst according to this aspect of the present invention can be produced by forming a coating layer on the surface of a catalyst support and then loading the second catalyst metal. The coating layer can be formed by preparing a slurry containing materials for the coating layer and coating the prepared slurry on the surface of a catalyst support and drying and calcining the slurry.

When the coating layer comprises a HC-adsorbing layer and a catalyst-contained layer, the coating layer can be produced by forming the HC-adsorbing layer on the catalyst support first and forming the catalyst-contained layer second.

Loading of the second catalyst metal can be made by impregnating a predetermined part of the coating layer with a solution of the second catalyst metal and then drying and calcining the part.

since the catalyst for purifying exhaust gases according to this aspect of the present invention has the second catalyst metal on the front stage part and/or the rear stage part, the catalyst has an advantage of exhibiting a high HC purifying ability.

(The Second Aspect of the Invention)

A catalyst for purifying exhaust gases according to the second aspect of the present invention comprises a catalyst support and a catalytic coating layer.

The catalyst support is a member with heat resistance. The catalyst support should have a heat resistance to the temperature of exhaust gases to be purified.

The catalyst support can be constituted by ordinary catalyst supports used for a conventional catalyst for purifying exhaust gases. As an example of the catalyst support, it is possible to employ a monolithic honeycomb support formed of a heat-resistant material such as cordierite and other ceramics and stainless steel and other heat-resistant metals.

The catalytic coating layer is a layer composed of β-zeolite, a Ce—Zr—Y composite oxide, refractory inorganic oxide and a catalyst metal and formed on the catalyst support.

β-zeolite has high HC-adsorbing ability and excellent heat resistance. In a catalyst for purifying exhaust gases, β-zeolite, like ordinary zeolite, adsorbs HC in exhaust gases at low temperature and releases the adsorbed HC at high temperature.

β-zeolite has a higher adsorbed-HC releasing temperature than other kinds of zeolite. Owing to the high HC-releasing temperature, when the adsorbed HC are released from β-zeolite, the temperature is high enough for the catalyst metal to exhibit catalytic activity. Therefore, the HC released from β-zeolite can be purified by the catalyst metal efficiently. As a result, the catalyst according to this aspect of the present invention attains improved HC-purifying ability.

The Ce—Zr—Y composite oxide is excellent in oxygen storage ability of adsorbing and releasing oxygen. Specifically speaking, in the case of cerium oxide added for a conventional catalyst for purifying exhaust gases, grain growth is observed at high temperature and oxygen storage ability deteriorates. However, in the case of a Ce—Zr—Y composite oxide, grain growth is suppressed and accordingly oxygen storage ability is exhibited even at high temperature. As a result, the catalyst according to this aspect of the present invention attains high efficiency of purifying exhaust gases.

The Ce—Zr—Y composite oxide can form a solid solution in part.

It is preferable that the Ce—Zr—Y composite oxide has a molar ratio of Ce, Zr, and Y in the range of 30 to 70:30 to 70:1 to 10.

The production method of the Ce—Zr—Y composite oxide can be, for example, as follows:

First respective solutions of predetermined amounts of cerium salt, zirconium salt and yttrium salt are prepared and mixed together, thereby precipitating a mixture of cerium, zirconium and yttrium. Next, the precipitate is calcined at a temperature of not less than 500° C., thereby obtaining a Ce—Zr—Y composite oxide.

The catalyst metal serves to purify exhaust gases. This catalyst metal preferably comprises at least one element selected from a group consisting of Pt, Pd and Rh. Since Pt, Pd and Rh have three-way catalytic characteristics, the catalyst metal can purify HC, co and $NO_x$.

The refractory inorganic oxide forms a catalytic coating layer and at the same time holds the catalyst metal in the coating layer. The refractory inorganic oxide is preferably alumina, since alumina has a high heat resistance and high chemical stability at high temperature. The alumina is preferably activated alumina (τ-alumina).

The catalytic coating layer preferably comprises the HC-adsorbing layer composed of β-zeolite and formed on the surface of the catalyst support, and the catalyst-contained layer composed of the Ce—Zr—Y composite oxide, the refractory inorganic oxide and the coating layer catalyst metal and formed on the HC-adsorbing layer. In this aspect of the present invention, it is preferable that the catalytic coating layer comprises the HC-adsorbing layer and the catalyst-contained layer, but the catalytic coating layer does not exclude a mixture of β-zeolite, the Ce—Zr—Y composite oxide, the catalyst metal and the refractory inorganic oxide.

When the catalytic coating layer has a layered structure of the HC-adsorbing layer and the catalyst-contained layer, the catalyst for purifying exhaust gases attains improved purifying ability. In this case, since the catalyst-contained layer is formed on the HC-adsorbing layer, when HC adsorbed by the HC-adsorbing layer are released from the HC-adsorbing layer, all the HC are brought in contact with the catalyst-contained layer. Therefore, the HC are purified by the catalyst metal contained in the catalyst-contained layer.

The catalyst metal is preferably loaded on the surface of the refractory inorganic oxide and/or the Ce—Zr—Y composite oxide. By loading the catalyst metal on the surface of the refractory inorganic oxide and/or the Ce—Zr—Y composite oxide, the catalytic activity of the catalyst can be suppreused from deteriorating. If the catalyst metal is loaded on β-zeolite, the catalyst metal suffers from HC poisoning due to the HC adsorbed by β-zeolite and the catalytic activity of the catalyst metal deteriorates.

The catalytic coating layer may include an additive which is used for a catalyst carrier layer of a conventional catalyst for purifying exhaust gases. BaO is an example of this additive.

In the catalyst according to this aspect of the present invention, the β-zeolite content of the catalytic coating layer is preferably 20 to 80 wt % based on the entire catalytic coating layer. Owing to the β-zeolite content of 20 to 80 wt %, the catalytic coating layer can adsorb HC and the HC purifying ability of the catalyst improves. If the β-zeolite content is less than 20 wt %, owing to the small β-zeolite amount, the amount of HC adsorbed decreases and the HC purifying ability of the catalyst deteriorates. On the other hand, the β-zeolite content of more than 80 wt % has an adverse affect on catalytic activity. The β-zeolite content is more preferably in the range from 40 to 60 wt %.

The Ce—Zr—Y composite oxide content of the catalytic coating layer is preferably 5 to 50 wt % based on the entire catalytic coating layer. By having the composite oxide, oxygen concentration becomes stable at the time of purifying exhaust gases. If the composite oxide content is less than 5 wt %, the effect of the addition is too small to purify CO and $NO_x$ in exhaust gases sufficiently. On the other hand, if the composite oxide content is more than 50 wt %, the refractory inorganic oxide content becomes small and conversion efficiency lowers. The composite oxide content is more preferably in the range from 10 to 30 wt %.

The catalyst metal content of the catalytic coating layer is preferably 1 to 10 wt %, based on the entire catalytic coating layer. That is to say, when the catalyst metal content of the catalytic coating layer is 1 to 10 wt %, exhaust gases are sufficiently purified. If the catalyst metal content is less than 1 wt %, owing to the small catalyst metal amount, exhaust gas purification is insufficient. On the other hand, if the catalyst metal content is more than 10 wt %, the effect of improving exhaust gas purifying ability becomes smaller with respect to an increase in the catalyst metal content. The catalyst metal content is more preferably in the range from 3 to 8 wt %.

The catalyst for purifying exhaust gases according to this aspect of the present invention can be produced by forming the catalytic coating layer on the surface of the catalyst support. The catalytic coating layer can be formed by preparing a slurry containing materials for the catalytic coating layer, coating the slurry on the surface of the catalyst support, and drying and calcining the coating.

When the catalytic coating layer comprises the HC-adsorbing layer and the catalyst-contained layer, the catalyst can be produced by forming a HC-adsorbing layer on a catalyst support and then forming a catalyst-contained layer.

The catalyst for purifying exhaust gases according to this aspect of the present invention is excellent in exhaust gas purifying ability, since the catalyst has β-zeolite, which has excellent HC-adsorbing ability, and a Ce—Zr—Y composite oxide, which has excellent oxygen storage ability.

Now, advantages of the catalyst according to the first and second aspects of the present invention will be described:

The catalyst for purifying exhaust gases according to the first aspect of the present invention has an advantage of exhibiting high HC purifying ability while maintaining purifying ability as a catalyst for purifying exhaust gases, because of comprising a coating layer composed of zeolite with HC-adsorbing ability and a first catalyst metal, and a second catalyst metal loaded on the front stage part and/or the rear stage part of the coating layer.

Specifically speaking, in a catalyst for purifying exhaust gases in which a second catalyst metal is loaded on a rear stage part, HC adsorbed by zeolite at low temperature are released from zeolite at high temperature and purified by the second catalyst metal. On the other hand, in a catalyst for purifying exhaust gases in which a second catalyst is loaded on a front stage part, early ignition of the second catalyst metal makes the timing of ignition of a first catalyst metal early, and HC adsorbed by zeolite are purified by the first catalyst metal. As a result, the catalyst of the present invention exhibits an advantage of exhibiting high HC-purifying ability.

On the other hand, in the catalyst for purifying exhaust gases according to the second aspect of the present invention, a catalytic layer has β-zeolite, which has excellent HC-adsorbing ability, and a Ce—Zr—Y composite oxide, which has excellent oxygen storage ability. Therefore, the catalyst has an advantage of exhibiting high HC-purifying ability while maintaining purifying ability as a catalyst for purifying exhaust gases. Specifically, since β-zeolite has high heat resistance and excellent HC-adsorbing ability, HC adsorption can be carried out until the temperature becomes high. As a result, the catalyst according to the second aspect of the present invention is particularly excellent HC-adsorbing ability.

DETAILED DESCRIPTION OF THE PREFERRED EMBODIMENTS

Now, the present invention will be explained by way of preferred embodiments.

Catalysts for purifying exhaust gases were produced as preferred embodiments of the present invention.

(First Preferred Embodiment)

A first embodiment is a catalyst for purifying exhaust gases, comprising a monolithic honeycomb support, a coating layer comprising a HC-adsorbing layer formed on a surface of the monolithic honeycomb support and composed of zeolite and a catalyst-contained layer composed of Pd and alumina and formed on the HC-adsorbing layer, and a second catalyst metal composed of Pd loaded on a front stage part of the coating layer, which is an upstream end of the exhaust gas flow.

The catalyst of the first embodiment was produced by the following method.

First prepared was a HC-adsorbing slurry composed of 100 g of zeolite of 5 to 50 μm in average particle diameter and 150 g of water. Second, the prepared HC-adsorbing slurry was coated on the surface of a monolithic honeycomb support with an axial length of 120 mm and a volume of 1.0 liter and dried and calcined, thereby forming a HC-adsorbing layer. The amount of the HC-adsorbing slurry coated on the monolithic honeycomb support was 100 g.

Next, a palladium nitrate solution containing 5 g of Pd in terms of Pd, 100 g of alumina powder, and 100 g of water were mixed together. After dried, the mixture was calcined at 500° C. for one hour and then pulverized, thereby obtaining Pd-loaded alumina powder. The Pd-loaded alumina powder had an average particle diameter of 5 µm.

Then, a catalytic slurry composed of 105 g of Pd-loaded alumina powder and 150 g of water was prepared. The catalytic slurry was coated on the surface of the monolithic support loaded with zeolite and dried and calcined, thereby forming a catalyst-contained layer on the surface of the HC-adsorbing layer. A coating layer was thus formed. The amount of the catalytic slurry coated was 105 g.

Then, 2 g of Pd in terms of Pd was loaded on a front stage part of the coating layer. The front stage part positioned at an upstream end of the exhaust gas flow to be purified, and the axial length of the front stage part was one-fifth of that of the coating layer. The amount of Pd loaded on the front stage part was 10 g/liter.

This Pd loading on the front stage part was carried out by immersing a part of the catalyst support to be a front stage part of the coating layer in a Pd-contained aqueous solution, and drying and calcining the part.

Thus, a catalyst for purifying exhaust gases according to the first embodiment of the present invention was produced by the foregoing production method.

(Second Preferred Embodiment)

A second preferred embodiment is a similar catalyst for purifying exhaust gases to the first preferred embodiment, except that Pd was loaded on a rear stage part instead of the front stage part. The rear stage part positioned at an downstream end of the exhaust gas flow and the axial length of the rear stage part was one-fifth of that of the coating layer. The amount of Pd loaded on the rear stage part was 2 g in terms of Pd.

(Third Preferred Embodiment)

A third preferred embodiment is a catalyst for purifying exhaust gases comprising a monolithic honeycomb support, a coating layer formed on the surface of the monolithic honeycomb support and composed of zeolite, Pd and alumina, and Pd loaded on a front stage part of the coating layer.

The catalyst of the third preferred embodiment was produced by the following method.

First, Pd-loaded alumina powder was produced in a similar way to the first preferred embodiment.

Second, a slurry composed of 105 g of Pd-loaded alumina powder, 100 g of zeolite and 300 g of water was prepared.

The prepared slurry was coated on the surface of a similar monolithic honeycomb support to that of the first preferred embodiment and dried and calcined, thereby forming a coating layer. The amount of the slurry coated was 205 g.

Then, 2 g of Pd in terms of Pd was loaded on the front stage part of the coating layer. This Pd loading on the front stage part was carried out in a similar way to the first preferred embodiment.

Thus, a catalyst for purifying exhaust gases of the third preferred embodiment was produced by the foregoing production method.

(Fourth Preferred Embodiment)

A fourth preferred embodiment is a similar catalyst for purifying exhaust gases to the first preferred embodiment, except that Pt was loaded on the front stage part instead of Pd.

(Fifth Preferred Embodiment)

A fifth preferred embodiment is a similar catalyst for purifying exhaust gases to the first preferred embodiment, except that Rh was loaded on the front stage part instead of Pd.

(Sixth Preferred Embodiment)

A sixth preferred embodiment is a similar catalyst for purifying exhaust gases to the first preferred embodiment, except that Pd and Rh were loaded on the front stage part instead of Pd. The weight ratio of Pd to Rh was 1:1.

Specifically speaking, the sixth preferred embodiment was a catalyst for purifying exhaust gases in which 1 g of Pd in terms of Pd and 1 g of Rh in terms of Rh were loaded on the front stage part.

The Pd and Rh loading was carried out by immersing a part of the coating layer to be a front stage part in an aqueous solution containing Pd and Rh at the weight ratio of 1:1, and drying and calcining the part.

(Seventh Preferred Embodiment)

A seventh preferred embodiment is a similar catalyst for purifying exhaust gases to the first preferred embodiment, except that Pt and Rh were loaded on the front stage part instead of Pd. The weight ratio of Pt and Rh was 1:1.

Specifically speaking, the seventh preferred embodiment is a catalyst for purifying exhaust gases in which 1 g of Pt in terms of Pt and 1 g of Rh in terms of Rh were loaded on the front stage part.

The Pt and Rh loading was carried out by immersing a part of the coating layer to be a front stage part in an aqueous solution containing Pt and Rh at the weight ratio of 1:1, and drying and calcining the part.

(Eighth Preferred Embodiment)

An eighth preferred embodiment is a similar catalyst for purifying exhaust gases to the first preferred embodiment, except that Pd and Pt were loaded on the front stage part instead of Pd. The weight ratio of Pd and Pt was 1:1.

Specifically speaking, the eighth preferred embodiment is a catalyst for purifying exhaust gases in which 1 g of Pd in terms of Pd and 1 g of Pt in terms of Pt were loaded on the front stage part.

The Pd and Pt loading was carried out by immersing a part of the coating layer to be a front stage part in an aqueous solution containing Pd and Pt at the weight ratio of 1:1, and drying and calcining the part.

(Ninth Preferred Embodiment)

A ninth preferred embodiment is a similar catalyst for purifying exhaust gases to the first preferred embodiment, except that Pd, Pt and Rh were loaded on the front stage part instead of Pd. The weight ratio of Pd, Pt and Rh was 1:1:1.

Specifically speaking, the ninth preferred embodiment is a catalyst for purifying exhaust gases in which ⅔ g of Pd in terms of Pd, ⅔ g of Pt in terms of Pt and ⅔ g of Rh in terms of Rh were loaded on the front stage part.

The Pd, Pt and Rh loading was carried out by immersing a part of the coating layer to be a front stage part in an aqueous solution containing Pd, Pt and Rh at the weight ratio of 1:1:1, and drying and calcining the part.

(Tenth Preferred Embodiment)

A tenth preferred embodiment is a similar catalyst for purifying exhaust gases to the first preferred embodiment, except that Pt was contained in the catalyst-contained layer instead of Pd.

The tenth preferred embodiment was produced in a similar way to the first preferred embodiment, except that a platinum nitrate solution containing 5 g of Pt in terms of Pt was employed instead of the palladium nitrate solution.

(Eleventh Preferred Embodiment)

An eleventh preferred embodiment is a similar catalyst for purifying exhaust gases to the first preferred embodiment, except that Rh was contained in the catalyst-contained layer instead of Pd.

The eleventh preferred embodiment was produced in a similar way to the first preferred embodiment, except that a rhodium nitrate solution containing 5 g of Rh in terms of Rh was employed instead of the palladium nitrate solution.

(Twelfth Preferred Embodiment)

A twelfth preferred embodiment is a similar catalyst for purifying exhaust gases to the first preferred embodiment, except that Pd and Rh were contained in the catalyst-contained layer instead of Pd. The weight ratio of Pd and Rh was 1:1.

The twelfth preferred embodiment was produced in a similar way to the first preferred embodiment, except that a mixture of a palladium nitrate solution and a rhodium nitrate solution was employed instead of the palladium nitrate solution. The mixed solution contained 2.5 g of Pd and 2.5 g of Rh.

(Thirteenth Preferred Embodiment)

A thirteenth preferred embodiment is a similar catalyst for purifying exhaust gases to the first preferred embodiment, except that Pd and Pt were contained in the catalyst-contained layer instead of Pd. The weight ratio of Pd and Pt was 1:1.

The thirteenth preferred embodiment was produced in a similar way to the first preferred embodiment, except that a mixture of a palladium nitrate solution and a platinum nitrate solution were employed instead of the palladium nitrate solution. This mixed solution contained 2.5 g of Pd and 2.5 g of Pt.

(Fourteenth Preferred Embodiment)

A fourteenth preferred embodiment is a similar catalyst for purifying exhaust gases to the first preferred embodiment, except that Pt and Rh were contained in the catalyst-contained layer instead of Pd. The weight ratio of Pt and Rh was 1:1.

The fourteenth preferred embodiment was produced in a similar way to the first preferred embodiment, except that a mixture of a platinum nitrate solution and a rhodium nitrate solution was employed instead of the palladium nitrate solution. This mixed solution contained 2.5 g of Pt and 2.5 g of Rh.

(Fifteenth Preferred Embodiment)

A fifteenth preferred embodiment is a similar catalyst for purifying exhaust gases to the first preferred embodiment, except that Pd, Pt and Rh were contained in the catalyst-contained layer instead of Pd. The weight ratio of Pd, Pt and Rh was 1:1:1.

The fifteenth preferred embodiment was produced in a similar way to the first preferred embodiment, except that a mixture of a palladium nitrate solution, a platinum nitrate solution and a rhodium nitrate solution was employed instead of the palladium nitrate solution. This mixed solution contained 1.7 g of Pd, 1.7 g of Pt, and 1.6 g of Rh.

(Sixteenth Preferred Embodiment)

A sixteenth preferred embodiment is a similar catalyst for purifying exhaust gases to the first preferred embodiment, except that a cerium composite oxide was added to the catalyst-contained layer. The added cerium composite oxide was Ce—Zr—Y.

The sixteenth preferred embodiment was produced in a similar way to the first preferred embodiment, except that 50 g of the cerium composite oxide was added to the catalytic slurry.

The cerium composite oxide was produced by a co-precipitation method.

(Seventeenth Preferred Embodiment)

A seventeenth preferred embodiment is a similar catalyst for purifying exhaust gases to the first preferred embodiment, except that Pd as a second catalyst metal was loaded on both the front stage part and the rear stage part. The axial length of the front stage part and the rear stage part were both one-third of that of the catalyst.

The seventeenth preferred embodiment was produced by applying the Pd loading on the rear stage part in the second preferred embodiment to the catalyst of the first preferred embodiment.

(Eighteenth Preferred Embodiment)

An eighteenth preferred embodiment is a similar catalyst for purifying exhaust gases to the first preferred embodiment, except that the axial length of the front stage part loaded with Pd as a second catalyst metal was one-third of that of the catalyst. The amount of the Pd as a second catalyst metal loaded on the catalyst of the eighteenth preferred embodiment was 2 g. The amount of the second catalyst metal loaded was 6 g/liter.

The eighteenth preferred embodiment was produced in a similar way to the first preferred embodiment, except that the length of the front stage part was changed.

(Nineteenth Preferred Embodiment)

A nineteenth preferred embodiment is a similar catalyst for purifying exhaust gases to the first preferred embodiment, except that the axial length of the front stage part loaded with Pd as a second catalyst metal was one-tenth of that of the catalyst. The amount of Pd as a second catalyst metal loaded on the catalyst of the nineteenth preferred embodiment was 2 g. The amount of the second catalyst metal loaded was 20 g/liter.

The nineteenth preferred embodiment was produced in a similar way to the first preferred embodiment, except that the length of the front stage part was changed.

First Comparative Example

A first comparative example is a similar catalyst for purifying exhaust gases to the first preferred embodiment, except that Pd was loaded not only on the front stage part but also on the entire coating layer as a catalyst carrier. The amount of Pd as a second catalyst metal loaded was 2 g. The amount of the second catalyst metal loaded was 2 g/liter.

The first comparative example was produced in a similar way to the first preferred embodiment, except that Pd was loaded not only on the front stage part but also on the entire coating layer.

Second Compatative Example

A second comparative example is a similar catalyst for purifying exhaust gases to the first preferred embodiment, except that the coating layer has no HC-adsorbing layer.

The second comparative example was produced in a similar way to the first preferred embodiment, except that the catalyst-contained layer was formed without forming the HC-adsorbing layer.

(Evaluation)

To evaluate the catalysts of the first to nineteenth preferred embodiments and the first and second comparative examples each of the catalysts for purifying exhaust gases was actually installed on a vehicle and exhaust gases from an engine in operation were purified by each catalyst for purifying exhaust gases to measure conversion efficiency.

(Experimental Method)

First, each of the catalysts for purifying exhaust gases to be evaluated was placed at a distance of 30 cm downstream from an actual vehicle engine of 2210 cc displacement. Then, the actual vehicle engine was operated and exhaust gases from the engine were purified by each catalyst for purifying exhaust gases. In this evaluation, HC components-conversion efficiency of each catalyst for purifying exhaust gases was measured.

The efficiency of converting HC components contained in exhaust gases was measured by using a chassis dynamometer and sampling exhaust gases from a tale pipe and examining the sample by automotive exhaust gas analyzing apparatus. The experimental conditions of the actual vehicle were LA No.4 Mode. The measurement results are shown in Table 1.

TABLE 1

|  | NMHC CONVERSION EFFICIENCY (%) |
|---|---|
| 1st PREFERRED EMBODIMENT | 97.6 |
| 2nd PREFERRED EMBODIMENT | 97.4 |
| 3rd PREFERRED EMBODIMENT | 97.1 |
| 4th PREFERRED EMBODIMENT | 97.4 |
| 5th PREFERRED EMBODIMENT | 97.6 |
| 6th PREFERRED EMBODIMENT | 97.3 |
| 7th PREFERRED EMBODIMENT | 97.2 |
| 8th PREFERRED EMBODIMENT | 97.5 |
| 9th PREFERRED EMBODIMENT | 97.2 |
| 10th PREFERRED EMBODIMENT | 97.7 |
| 11th PREFERRED EMBODIMENT | 97.5 |
| 12th PREFERRED EMBODIMENT | 97.0 |
| 13th PREFERRED EMBODIMENT | 97.2 |
| 14th PREFERRED EMBODIMENT | 97.0 |
| 15th PREFERRED EMBODIMENT | 97.3 |
| 16th PREFERRED EMBODIMENT | 96.8 |
| 17th PREFERRED EMBODIMENT | 97.5 |
| 18th PREFERRED EMBODIMENT | 97.1 |
| 19th PREFERRED EMBODIMENT | 97.3 |
| 1st COMPARATIVE EXAMPLE | 93.8 |
| 2nd COMPARATIVE EXAMPLE | 93.1 |

As apparent from Table 1, the catalysts for purifying exhaust gases of the first to nineteenth preferred embodiments showed high HC conversion efficiency. Also apparent from the first to nineteenth preferred embodiments, high HC conversion efficiency was exhibited in either case where the catalyst metal contained in the coating layer and the second catalyst metal were different from each other or the same. Moreover, when the axial length of the front stage part loaded with the second catalyst metal was in the range from one-third to one-tenth of that of the catalyst support, sufficiently high conversion efficiency was observed.

The first comparative example showed a poor HC conversion efficiency because the second catalyst metal was loaded on the entire coating layer. The second comparative example also showed a poor HC conversion efficiency because the catalyst had no HC-adsorbing layer.

The catalysts of the first to nineteenth preferred embodiments exhibited high HC conversion efficiency because the second catalyst metal was loaded on the front stage part and/or the rear stage part of the coating layer with zeolite.

(Twentieth Preferred Embodiment)

A twentieth preferred embodiment is a catalyst for purifying exhaust gases comprising: a HC-adsorbing layer formed on the surface of a monolithic honeycomb support and composed of β-zeolite, and a catalyst-contained layer formed on the HC-adsorbing layer and composed of Pd, a Ce—Zr—Y composite oxide and alumina.

The catalyst of the twentieth preferred embodiment was produced by the following method;

First, a HC-adsorbing slurry composed of 100 g of Bβ-zeolite of 5 to 50 µm in average diameter and 150 g of water was prepared. Next, the prepared HC-adsorbing slurry was coated on a surface of a monolithic honeycomb support of 1.0 liter in volume and dried and calcined the coating, thereby forming a HC-adsorbing layer. The amount of the HC-adsorbing slurry coated on the monolithic honeycomb support was 100 g.

Next, a palladium nitrate solution containing 5 g of Pd in terms of Pd, 100 g of alumina powder and 100 g of water were mixed together. After dried, the mixture was calcined at 500° C. for one hour and then pulverized, thereby obtaining Pd-loaded alumina powder. The Pd-loaded alumina powder had an average particle diameter of 5 µm.

The Ce—Zr—Y composite oxide powder was produced by mixing a cerium nitrate solution, a zirconium nitrate solution, and a yttrium nitrate solution, adding ammonia water to the mixture and then drying and calcining the mixture.

After that, a catalytic slurry composed of 105 g of the Pd-loaded alumina powder, 50 g of the Ce—Zr—Y composite oxide and 200 g of water was prepared. Then this catalytic slurry was coated on the surface of a zeolite-loaded monolithic support and dried and calcined, thereby forming a catalyst-contained layer on the surface of the HC-adsorbing layer. The amount of the catalytic slurry coated was 155 g.

Thus, the catalyst of the twentieth preferred embodiment was produced by the foregoing production method.

(Twenty-First Preferred Embodiment)

A twenty-first preferred embodiment is a catalyst for purifying exhaust gases having a coating layer formed on a surface of a monolithic honeycomb support, composed principally of alumina and containing β-zeolite, Pd and a Ce—Zr—Y composite oxide.

The catalyst of the twenty-first preferred embodiment was produced by the following method:

First, Pd-loaded alumina powder and a Ce—Zr—Y composite oxide powder were produced by a similar method to the first preferred embodiment.

Next, a slurry composed of 105 g of Pd-loaded alumina powder, 50 g of the Ce—Zr—Y composite oxide powder, 100 g of β-zeolite, and 350 g of water was produced.

The prepared slurry was coated on the surface of a similar monolithic honeycomb support to that of the twentieth preferred embodiment and then dried and calcined. The amount of the slurry coated was 255 g.

(Twenty-Second Preferred Embodiment)

A twenty-second preferred embodiment was a similar catalyst for purifying exhaust gases to the twentieth preferred embodiment, except that Pt was contained in the coating layer instead of Pd. The twenty-second preferred embodiment was produced by a similar method to the twentieth preferred embodiment, except that a platinum nitrate solution was employed instead of the palladium nitrate solution.

(Twenty-Third Preferred Embodiment)

A twenty-third preferred embodiment is a similar catalyst for purifying exhaust gases to the twentieth preferred embodiment, except that Rh was contained in the coating layer instead of Pd.

The twenty-third preferred embodiment was produced in a similar way to the twentieth preferred embodiment, except that a rhodium nitrate solution was employed instead of the palladium nitrate solution.

(Twenty-Fourth Preferred Embodiment)

A twenty-fourth preferred embodiment is a similar catalyst for purifying exhaust gases to the twentieth preferred embodiment, except that Pd and Rh were contained in the coating layer instead of Pd. The weight ratio of Pd and Rh was 1:1.

The twenty-fourth preferred embodiment was produced by a similar method to the twentieth preferred embodiment, except that a mixture of a palladium nitrate solution and a rhodium nitrate solution were employed instead of the palladium nitrate solution. The mixed solution contained 2.5 g of Pd in terms of Pd and 2.5 g of Rh in terms of Rh.

(Twenty-Fifth Preferred Embodiment)

A twenty-fifth preferred embodiment is a similar catalyst for purifying exhaust gases to the twentieth preferred embodiment, except that Pd and Pt were contained in the coating layer instead of Pd. The weight ratio of Pd and Pt was 1:1.

The twenty-fifth preferred embodiment was produced by a similar method to the twentieth preferred embodiment, except that a mixture of a palladium nitrate solution and a platinum nitrate solution was employed instead of the palladium nitrate solution. The mixed solution contained 2.5 g of Pd in terms of Pd and 2.5 g of Pt in terms of Pt.

(Twenty-Sixth Preferred Embodiment)

A twenty-sixth preferred embodiment is a similar catalyst for purifying exhaust gases to the twentieth preferred embodiment, except that Pt and Rh were contained in the coating layer instead of Pd. The weight ratio of Pt and Rh was 1:1.

The twenty-sixth preferred embodiment was produced by a similar method to the twentieth preferred embodiment, except that a mixture of a platinum nitrate solution and a rhodium nitrate solution was employed instead of the palladium nitrate solution. The mixed solution contained 2.5 g of Pt in terms of Pt and 2.5 g of Rh in terms of Rh.

(Twenty-Seventh Preferred Embodiment)

The twenty-seventh preferred embodiment is a similar catalyst for purifying exhaust gases to the twentieth preferred embodiment, except that Pd, Pt and Rh were contained in the coating layer instead of Pd. The weight ratio of Pd, Pt and Rh was 1:1:1.

The twenty-seventh preferred embodiment was produced by a similar method to the twentieth preferred embodiment, except that a mixture of a palladium nitrate solution, a platinum nitrate solution and a rhodium nitrate solution was employed instead of the palladium nitrate solution. The mixed solution contained 5/3 g of Pd in terms of Pd, 5/3 g of Pt in terms of Pt and 5/3 g of Rh in terms of Rh.

(Twenty-Eighth Preferred Embodiment)

A twenty-eighth preferred embodiment is a catalyst for purifying exhaust gases comprising a HC-adsorbing layer formed on a surface of a monolithic honeycomb support and composed of β-zeolite, and a catalyst-contained layer formed on the HC-adsorbing layer and composed of Pd, a Ce—Zr—Y composite oxide and alumina, the Pd being loaded on the Ce—Zr—Y composite oxide.

The catalyst of the twenty-eighth preferred embodiment was produced by the following method:

First, a HC-adsorbing layer was formed on the surface of a monolithic honeycomb support in a similar way to the twentieth preferred embodiment.

Next, a Ce—Zr—Y composite oxide layer was produced by a similar way to the twentieth preferred embodiment. Then, a palladium nitrate solution containing 5 g of Pd in term of Pd, 50 g of the composite oxide powder and 50 g of water were mixed, thereby loading pd on the surface of the composite oxide. After dried, the mixture was calcined at 500° C. for one hour and pulverized, thereby obtaining Pd-loaded composite oxide powder. The Pd-loaded composite oxide powder had an average particle diameter of 5 μm.

After that, a catalytic slurry composed of 55 g of the Pd-loaded composite oxide powder, 100 g of alumina powder, and 200 g of water was prepared. Then, the catalytic slurry was coated on the surface of the monolithic support having the HC-adsorbing layer thereon, and dried and calcined, thereby forming a catalyst-contained layer on the surface of the HC-adsorbing layer. The amount of the catalytic slurry coated was 155 g.

Thus, the catalyst of the twenty-seventh preferred embodiment was produced by the foregoing method.

Third Comparative Example

A third comparative example is a similar catalyst for purifying exhaust gases to the twentieth preferred embodiment, except that a Ce—Zr composite oxide was employed in stead of the Ce—Zr—Y composite oxide.

The Ce—Zr composite oxide was produced by mixing a cerium nitrate solution and a zirconium nitrate solution, adding ammonia water to the mixture, and drying and calcining the mixture.

Fourth Comparative Example

A fourth comparative example is a similar catalyst for purifying exhaust gases to the twentieth preferred embodiment, except that ZSM-5 zeolite was employed instead of β-zeolite.

Fifth Comparative Example

A fifth comparative example is a similar catalyst for purifying exhaust gases to the twenty-first preferred embodiment, except that Pd was loaded on the β-zeolite.

Sixth Comparative Example

A sixth comparative example is a similar catalyst for purifying exhaust gases to the twenty-first preferred embodiment, except that no β-zeolite was contained.

(Evaluation)

To evaluate the catalysts for purifying exhaust gases of the twentieth to twenty-eighth preferred embodiments and the third to sixth comparative examples, each of the catalysts for purifying exhaust gases was actually installed on a vehicle and exhaust gases from an engine in operation were purified by each catalyst.

(Evaluation Test)

The evaluation of the twentieth to twenty-eighth preferred embodiments and the third to sixth comparative examples was carried out by a similar method to that used in the aforementioned evaluation of the first to nineteenth preferred embodiments. In this evaluation test, conversion efficiency of not only HC components but also CO component and $NO_x$ components was measured. The measurement results are shown in Table 2.

TABLE 2

| | EXHAUST GAS CONVERSION EFFICIENCY | | |
| --- | --- | --- | --- |
| | NHMC(%) | CO(%) | $NO_x$(%) |
| 20th PREFERRED EMBODIMENT | 98.5 | 92.0 | 98.5 |
| 21st PREFERRED EMBODIMENT | 97.5 | 90.8 | 97.7 |
| 22nd PREFERRED EMBODIMENT | 98.3 | 92.1 | 98.7 |
| 23rd PREFERRED EMBODIMENT | 98.5 | 95.3 | 99.8 |
| 24th PREFERRED EMBODIMENT | 98.6 | 93.5 | 99.1 |
| 25th PREFERRED EMBODIMENT | 98.2 | 91.1 | 97.9 |
| 26th PREFERRED EMBODIMENT | 98.5 | 93.8 | 99.3 |
| 27th PREFERRED EMBODIMENT | 98.7 | 92.2 | 98.8 |
| 28th PREFERRED EMBODIMENT | 97.9 | 92.3 | 98.6 |
| 3rd COMPARATIVE EXAMPLE | 97.8 | 86.8 | 94.2 |
| 4th COMPARATIVE EXAMPLE | 94.5 | 91.5 | 98.0 |

TABLE 2-continued

| | EXHAUST GAS CONVERSION EFFICIENCY | | |
|---|---|---|---|
| | NHMC(%) | CO(%) | NO$_x$(%) |
| 5th COMPARATIVE EXAMPLE | 88.5 | 82.3 | 85.1 |
| 6th COMPARATIVE EXAMPLE | 93.9 | 91.3 | 98.1 |

As apparent from Table 2, the catalysts for purifying exhaust gases of the twentieth to twenty-eighth preferred embodiments showed high efficiency of converting harmful HC components, CO component and NO$_x$ components.

The twentieth to twenty-eighth preferred embodiments showed nigh exhaust gas purifying ability, since the catalyst metal was constituted by at least one element of selected from a group consisting Pd, Pt and Rh. In either case where the catalyst metal was loaded on the alumina or on the Ce—Zr—Y composite oxide, high exhaust gas purifying ability was exhibited.

The third comparative example had a high HC-conversion efficiency of 97.8% but a poor CO conversion efficiency and a poor NO$_x$ conversion efficiency. This is because oxygen storage ability of the composite oxide was lowered by changing the composite oxide from the Ce—Zr—Y composite oxide to the Ce—Zr composite oxide.

The fourth comparative example had a sufficiently high CO conversion efficiency and NO$_x$ conversion efficiency for a catalyst for purifying exhaust gases, but had a low HC conversion efficiency of 94.5%. This is because HC-adsorbing ability was lowered by changing from β-zeolite to ZSM-5 zeolite.

The fifth comparative example deteriorated in any of the HC conversion efficiency, and the CO conversion efficiency and NO$_x$ conversion efficiency. This is because HC-adsorbing ability of the zeolite and the exhaust gas purifying ability of Pd were deteriorated by loading Pd on zeolite.

The sixth comparative example had a low HC conversion efficiency. This is because HC adsorption could not be conducted due to having no zeolite.

As apparent from the twentieth to twenty-eighth preferred embodiments, catalysts for purifying exhaust gases can exhibit high purifying ability if the catalysts have a Ce—Zr—Y composite oxide and β-zeolite and a catalyst metal is loaded not on palladium.

Obviously, many modifications and variations of the present invention are possible in the light of the above teachings. It is therefore to be understood that within the scope of the appended claims, the invention may be practiced otherwise than as specifically described.

What is claimed is:

1. A catalyst for purifying exhaust gases, comprising:
   a heat-resistant catalyst support; and
   a catalytic coating layer composed of β-zeolite, a Ce—Zr—Y composite oxide, refractory inorganic oxide and a catalyst metal and formed on a surface of the catalyst support, wherein said Ce—Zr—Y composite oxide is contained in 5–50 wt % based on the entire coating layer.

2. A catalyst for purifying exhaust gases according to claim 1, wherein said catalytic coating layer comprises:
   a HC-adsorbing layer composed of said β-zeolite and formed on a surface of said catalyst support; and
   a catalyst-contained layer composed of said Ce—Zr—Y composite oxide, said refractory inorganic oxide and said catalyst metal and formed on the HC-adsorbing layer.

3. A catalyst for purifying exhaust gases according to claim 2, wherein said Ce—Zr—Y composite oxide is contained in 10–30 wt % based on the entire coating layer.

4. A catalyst for purifying exhaust gases according to claim 2, wherein said β-zeolite is contained in 20–80 wt % based on the entire coating layer.

5. A catalyst for purifying exhaust gases according to claim 2, wherein said β-zeolite is contained in 40–60 wt % based on the entire coating layer.

6. A catalyst for purifying exhaust gases according to claim 1, wherein said catalyst metal is loaded on a surface of said refractory inorganic oxide and/or said Ce—Zr—Y composite oxide.

7. A catalyst for purifying exhaust gases according to claim 1, wherein said catalyst metal comprises at least one element selected from a group consisting of Pt, Pd and Rh.

8. A catalyst for purifying exhaust gases according to claim 1, wherein said refractory inorganic metal is alumina.

9. A catalyst for purifying exhaust gases according to claim 1, wherein said Ce—Zr—Y composite oxide is contained in 10–30 wt % based on the entire coating layer.

10. A catalyst for purifying exhaust gases according to clainm 1, wherein said β-zeolite is contained in 20–80 wt % based on the entire coating layer.

11. A catalyst for purifying exhaust gases according to claim 1, wherein said β-zeolite is contained in 40–60 wt % based on the entire coating layer.

* * * * *